United States Patent
Smith et al.

[19]

[11] Patent Number: 5,947,063
[45] Date of Patent: Sep. 7, 1999

[54] STOICHIOMETRIC SYNTHESIS, EXHAUST, AND NATURAL-GAS COMBUSTION ENGINE

[75] Inventors: Jack A. Smith; Daniel J. Podnar; James J. Cole; John T. Kubesh; Gordon J. Bartley, all of San Antonio, Tex.

[73] Assignee: Southwest Research Institute, San Antonio, Tex.

[21] Appl. No.: 08/972,644

[22] Filed: Nov. 18, 1997

[51] Int. Cl.$^6$ .................................................. F02B 43/08
[52] U.S. Cl. .......................... 123/3; 123/DIG. 12; 60/299
[58] Field of Search ...................... 123/3, 527, DIG. 12; 60/299

[56] References Cited

U.S. PATENT DOCUMENTS

| | | | |
|---|---|---|---|
| 4,033,133 | 7/1977 | Houseman et al. | 60/606 |
| 4,416,224 | 11/1983 | Hobby et al. | 123/3 |
| 4,520,764 | 6/1985 | Ozawa et al. | 123/3 |
| 4,722,920 | 2/1988 | Kimura et al. | 502/439 |
| 4,738,946 | 4/1988 | Yamashita et al. | 502/303 |
| 4,844,837 | 7/1989 | Heck et al. | 252/373 |
| 4,923,842 | 5/1990 | Summers | 502/261 |
| 5,081,977 | 1/1992 | Swenson | 123/527 |
| 5,139,002 | 8/1992 | Lynch et al. | 123/575 |
| 5,179,059 | 1/1993 | Domescle et al. | 502/303 |
| 5,207,185 | 5/1993 | Greiner et al. | 123/3 |
| 5,299,536 | 4/1994 | Moard et al. | 123/3 |
| 5,339,634 | 8/1994 | Gale et al. | 60/723 |
| 5,411,927 | 5/1995 | Choudhary et al. | 502/302 |
| 5,439,865 | 8/1995 | Abe et al. | 502/333 |
| 5,451,385 | 9/1995 | Hansel et al. | 423/213 |
| 5,486,313 | 1/1996 | DeJong et al. | 252/373 |
| 5,500,149 | 3/1996 | Green et al. | 252/373 |
| 5,524,432 | 6/1996 | Hansel | 60/274 |
| 5,538,051 | 7/1996 | Brown et al. | 123/527 |
| 5,542,398 | 8/1996 | Marcon | 123/525 |

FOREIGN PATENT DOCUMENTS 61171870  1/1985  Japan .

OTHER PUBLICATIONS

Production of Syngas by Direct Catalytic Oxidation of Methane by D.A. Hickman and L.D. Schmidt; Science, vol. 259, pp. 343–346; Jan. 15, 1993.

Synthesis Gas Formation by Direct Oxidation of Methane Over Rh Monoliths, D.A. Hickman, E.A. Haupfear and L.D. Schmidt; J.C. Balzer AG, Science Publishers; pp. 223–237.

A Two–Charge Engine Concept: Hydrogen Enrichment by John Houseman and Frank W. Hoehn; Jet Propulstion Laboratory, California Institute of Technology; pp. 3522–3532.

Some Problems and Benefits from the Hydrogen Fuelded Spark Ignition Engine by Harry C. Watson and Eric E. Milkins; 1978 Society of Automotive Engineers, Inc., pp. 1170–1177.

Internal Combustion Engine Fundamentals; Chapter 11, Pollutant Formation and Control; pp. 567–585.

An Experimental Study of Air–Reformed Natural Gas in Spark–Ignited Engines by Dale Andreatta and Robert W. Dibble; 1996 Society of Automotive Engineers, Inc.; pp. 85–93.

Development of Thermal–Resistant Rhodium Catalysts by H.K. Stepien, W.B. Williamson, and H.S. Gandhi; 1980 Society of Automotive Engineers, Inc.; pp. 1–6.

Effective Rhodium Utilization in Automotive Exhaust Catalysts by C.Z. Wan and J.C Dettling; 1986 Society of Automotive Engineers, Inc.; pp. 1–7.

(List continued on next page.)

*Primary Examiner*—John Kwon
*Attorney, Agent, or Firm*—Baker & Botts, L.L.P.

[57] ABSTRACT

A method of stoichiometrically operating an internal combustion engine. The engine is equipped with a pre-engine catalyst, which produces syngas from natural gas and air. The engine receives the syngas, as well as natural gas, and recirculated exhaust gas. The amount of syngas and the amount of recirculated exhaust gas are maximized for a desired engine efficiency and $NO_x$ emissions level.

8 Claims, 5 Drawing Sheets

OTHER PUBLICATIONS

Development of Thermal Resistant Three–Way Catalysts by Naoto Miyoshi, Shinichi Matsumoto, Masakuni Ozawa and Mareo Kimura; 1989 Society of Automotive Engineers; pp. 1–8.

A Single–Cylinder Engine Study of Hydrogen–Rich Fuels by Fred B. Parks; 1976 Society of Automotive Engineers.

Evaluation of the Hydrogen–Supplemented Fuel Concept with an Experimental Multicylinder Engine by J. Scott MacDonald; 1976 Society of Automotive Engineers.

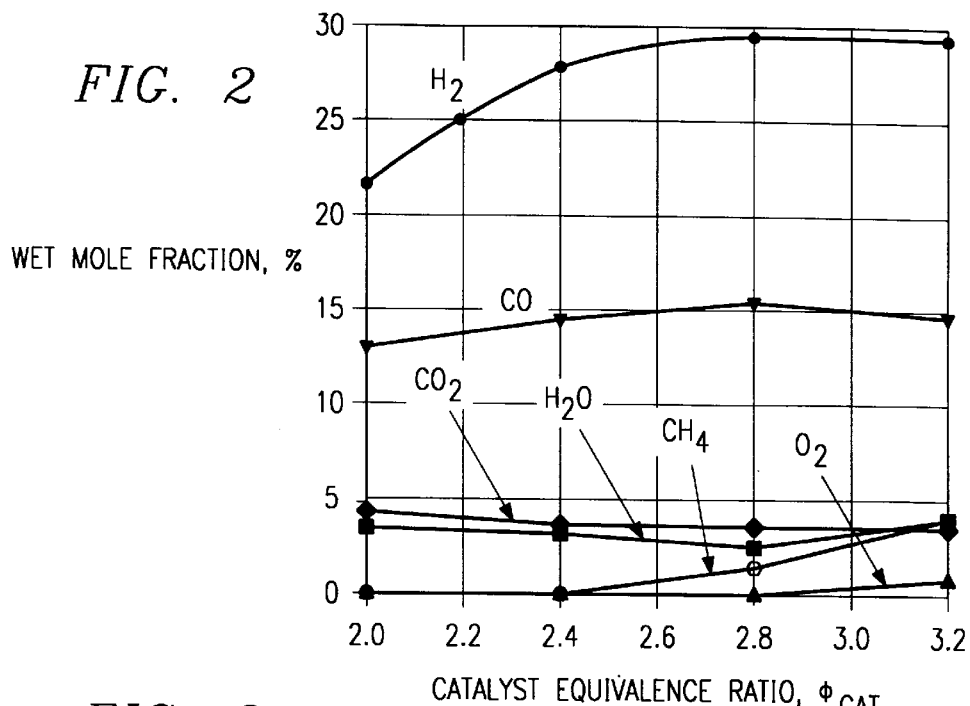
FIG. 2
FIG. 3
| GAS | WET MOLE, FRACTION, % | WET MASS, FRACTION, % |
|---|---|---|
| $H_2$ | 29.7 | 2.9 |
| CO | 15.1 | 20.8 |
| $H_2O$ | 3.4 | 3.0 |
| $CO_2$ | 3.3 | 7.1 |
| $CH_4$ | 1.2 | 0.9 |
| $O_2$ | 0.0 | 0.0 |
| $N_2$ | 47.3 | 65.2 |
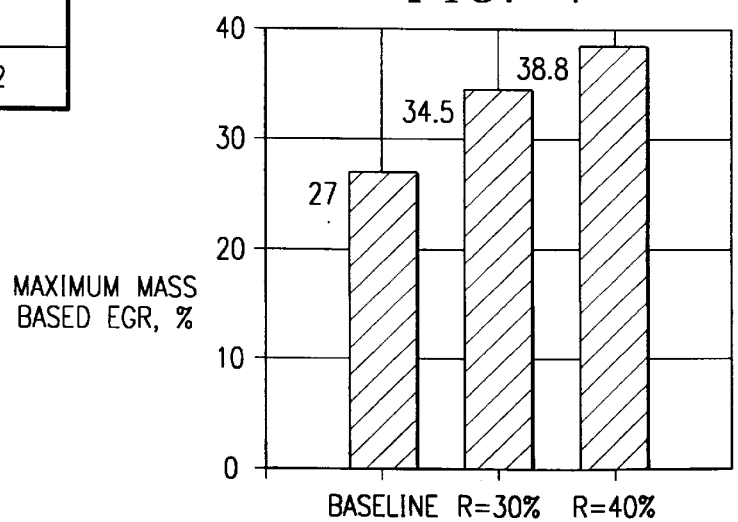
FIG. 4

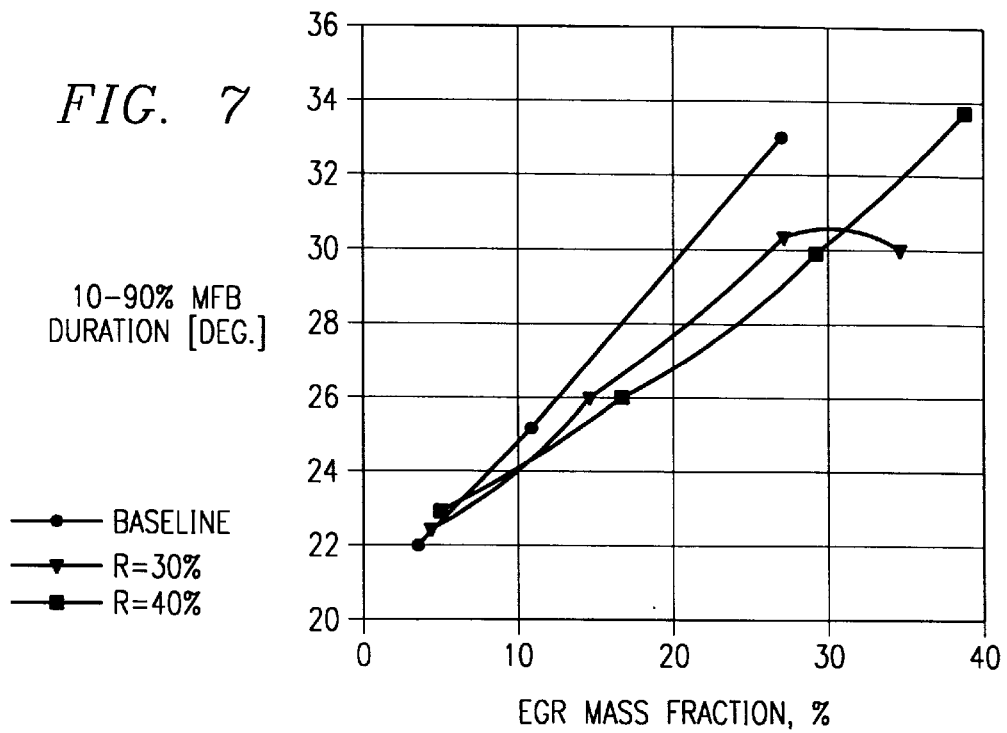
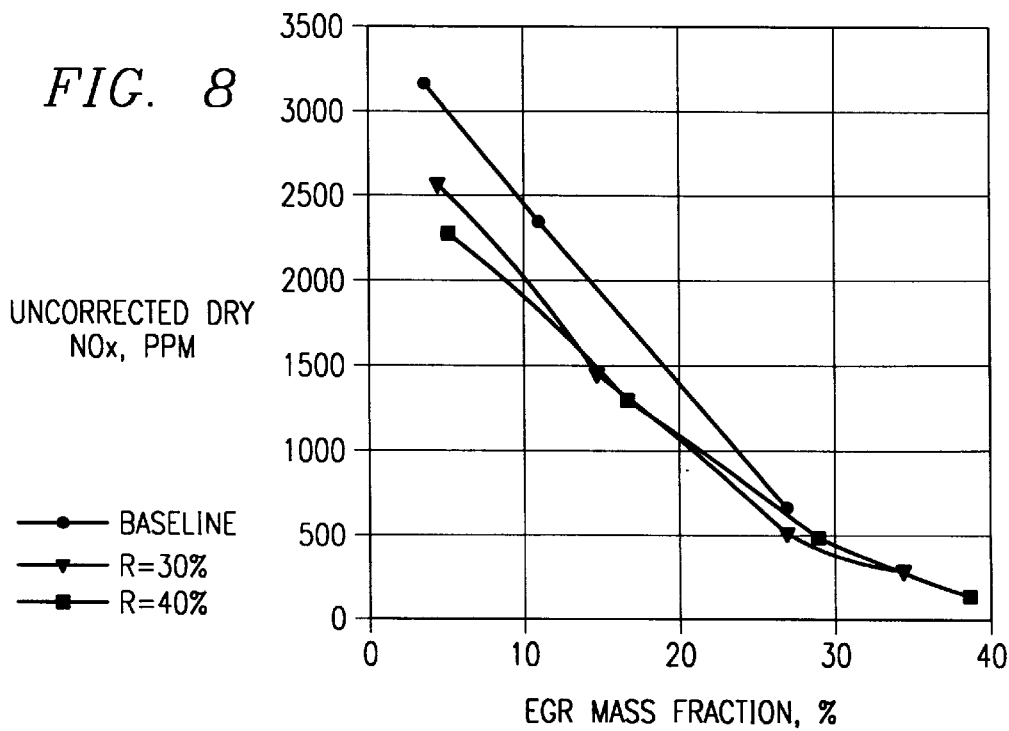

STOICHIOMETRIC SYNTHESIS, EXHAUST, AND NATURAL-GAS COMBUSTION ENGINE

TECHNICAL FIELD OF THE INVENTION

The present invention relates generally to internal combustion engines and more particularly to a natural-gas-fueled engine that operates stoichiometrically, using a mixture of synthesis gas, recirculated exhaust gas, and natural gas.

BACKGROUND OF THE INVENTION

Heavy-duty, lean-burn, natural-gas engines have found many applications in the stationary ergine marketplace because of their ability to operate more efficiently than their stoichiometric counterparts. However, these engines produce a significant amount of nitrogen oxide ($NO_x$) emissions. Presently, for these engines, there are no cost effective methods of exhaust gas after-treatment to reduce $NO_x$ emissions to levels mandated by various legislative authorities.

In lean-burn engines, oxidation catalysts have been used to oxidize unburned hydrocarbon (HC) and carbon monoxide (CO) emissions. However, $NO_x$ is not affected and is typically controlled by operating the engine as lean as possible to take advantage of the heat capacity of the excess air. The excess air in the air/fuel charge functions as a heat sink to reduce in-cylinder gas temperatures and minimize the rate of $NO_x$ formation.

In stoichiometric engines, three-way catalysts are used to control the emissions of $NO_x$, unburned HCs, and CO simultaneously. These three-way catalysts provide better exhaust gas after-treatment than is available in the case of lean-burn engines.

The trade-off between stoichiometric operation and lean-burn operation is economic, manifesting itself in the thermal efficiency/$NO_x$ relationship. Engine operators incur an economic penalty by operating stoichiometric engines for legislative compliance because stoichiometric engines are currently less efficient than comparable lean-burn engines.

A new method of controlling $NO_x$ emissions in lean-burn engines involves the use of syngas. Tests have been performed on a multi-cylinder engine where bottled blends of selected syngas components were used to simulate natural gas/syngas mixtures. The tests were conducted over a range of equivalence ratios and syngas fractions where it was shown that $NO_x$ could be held to less than 30 ppm (~0.3 g/bhp hr) at a BTE (brake thermal efficiency) of 39 percent. Similar work has been conducted on gasoline engines with air-reformed gasoline. In those tests it was shown that an engine could operate at leaner equivalence ratios than on pure gasoline. In addition, $NO_x$ decreased because in-cylinder temperatures were reduced due to the added heat capacity of the excess air.

In stoichiometric engines, exhaust gas recirculation (EGR) has been used to reduce $NO_x$ emissions as well as to increase efficiency by allowing the engine to operate with increased boost pressures and compression ratios. However, the maximum EGR dilution level is quickly reached, and excess EGR causes misfire. The typical engine EGR tolerance is about 25% of the total fuel mix.

SUMMARY OF THE INVENTION

One aspect of the invention is a method of stoichiometrically operating an internal combustion engine. The engine is fueled by air, natural gas, syngas, and recirculated exhaust gas. Air is delivered directly to the engine and to a pre-engine catalyst that performs partial oxidization of methane. Natural gas is also delivered directly to the engine and to the pre-engine catalyst. The catalyst generates syngas containing hydrogen, and the amount of natural gas delivered to said pre-engine catalyst defines a syngas fraction of natural gas relative to all the natural gas used by the system. The amount of exhaust gas to the engine defines an exhaust gas fraction relative to the air, natural gas, exhaust gas, and syngas. The syngas fraction and the exhaust gas fraction are maximized for a desired engine efficiency and pre-three-way catalyst $NO_x$ level.

An advantage of the invention is that the syngas addition to the fuel mixture extends the EGR tolerance of the engine. In effect, lean-burn efficiency is obtained in a stoichiometric engine by using excessive levels of EGR in the same manner as excess air in a lean-burn engine. No external hydrogen supply is required because the hydrogen is created by partially oxidizing part of the engine's primary fuel as the engine is running.

The increased EGR tolerance results in reduced $NO_x$ emissions. Also, the engine may operate at greater brake thermal efficiencies (BTEs) than conventional stoichiometric natural gas engines. The ability to operate at stoichiometric air/fuel ratios permits use of three-way catalysts to treat the unrecirculated exhaust gas. This further reduces oxides of nitrogen, unburned hydrocarbons, and carbon monoxide. In sum, not only does the engine have efficiency comparable to lean-burn engine but also has low emissions characteristic of stoichiometric engines.

BRIEF DESCRIPTION OF THE DRAWINGS

FIG. 2 illustrates the composition of the syngas produced by the pre-engine catalyst at various catalyst equivalence ratios.

FIG. 3 illustrates the composition of the syngas produced by the pre-engine catalyst at a catalyst equivalence ratio of 2.8.

FIG. 4 illustrates maximum EGR fractions for syngas fractions of 0%, 30%, and 40%.

FIGS. 6 and 7 illustrate factors determining engine efficiency and their relationship to varying EGR fractions.

FIGS. 8 and 9 illustrate how uncorrected $NO_x$ varies with the syngas fraction and EGR fraction.

DETAILED DESCRIPTION OF THE INVENTION

The following description is directed to a novel approach of operating an engine, which combines the high efficiency of lean-burn combustion with low $NO_x$ emissions. This approach is referred to herein as "stoichiometric synthesis, exhaust, and natural gas combustion" (SSENGC). Essentially, the SSENGC approach is to use a pre-engine catalyst and a particular composition of fuel entering the intake manifold of the engine. The amount of natural gas delivered to the pre-engine catalyst (and thus the proportion of syngas in the fuel mixture) as well as the proportion of recirculated exhaust are determined by evaluating the engine's efficiency and emissions performance over a range of syngas and EGR fractions.

The method of the invention may be applied to any internal combustion engine, stationary or vehicular. The engine may be multi-cylinder or single cylinder, and may operate with or without intake air compression via a turbocharger or some other means.

Figure 1:
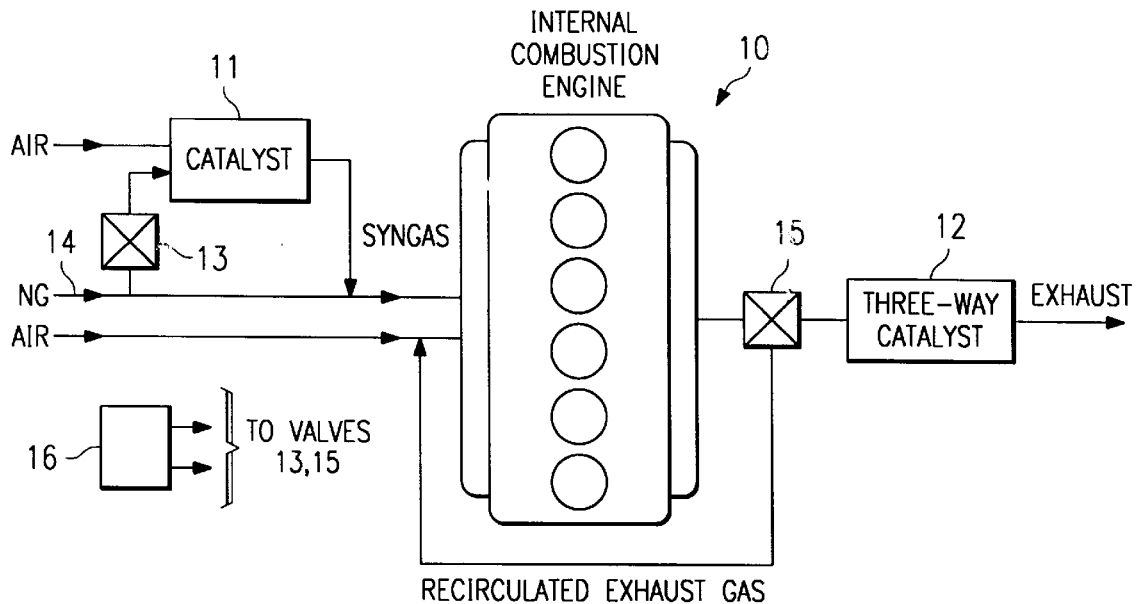
FIG. 1 is a block diagram of a stoichiometric engine having a pre-engine catalyst and an after-treatment catalyst in accordance with the invention.
Figure 1A:
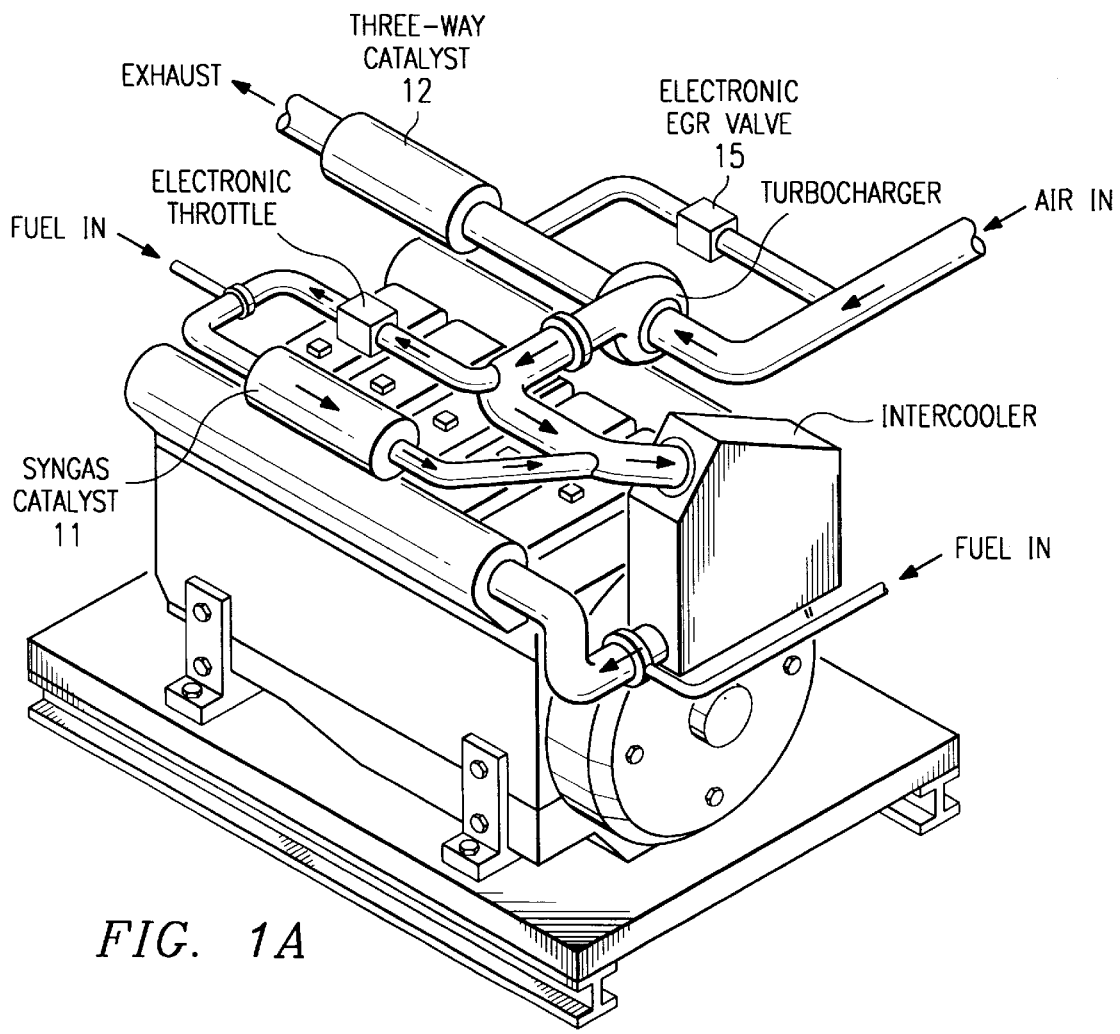
FIG. 1A illustrates a stationary engine implementation of the system of FIG. 1.

FIG. 1 is a block diagram of a SSENGC system in accordance with the invention. FIG. 1A is a perspective view of the same system, implemented as a stationary engine with a low pressure EGR loop system.

An internal combustion engine 10 is connected to a pre-engine catalyst 11 and an after-treatment catalyst 12. Engine 10 is fueled on a mixture of synthesis gas (syngas), recycled exhaust gas, and natural gas. The natural gas may be analyzed in terms of methane ($CH_4$), because natural gas is typically about 95% methane.

The natural gas is delivered both directly to engine 10 and to pre-engine catalyst 11. In FIG. 1, a valve 13 diverts a portion of natural gas from a main natural gas intake line 14, but other means for delivering natural gas to pre-engine catalyst 11 could be used.

As explained below, a typical proportion of natural gas to the catalyst 11 as compared to natural gas to the system is 30%. However, this proportion can be varied as an engine operating parameter. A controller 16 controls valve 13 so that the desired fraction of natural gas is delivered to catalyst 11.

The air/fuel ratio in pre-engine catalyst 11 will vary depending on the type of catalyst that is used, but in general is calculated so as to maximize hydrogen yield with minimum $CH_4$ and $O_2$ breakthrough. The calculation of a catalyst equivalence ratio is explained below in connection with FIGS. 2 and 3.

Pre-engine catalyst 11 is a monolithic catalyst, in which the natural gas is partially oxidized. While engine 10 is running, catalyst 11 reacts with air to form hydrogen ($H_2$), water ($H_2O$), carbon monoxide (CO), carbon dioxide ($CO_2$), and nitrogen ($N_2$). The product mixture exiting the catalyst is synthesis gas, often called syngas. Assuming a feed gas of methane, the global syngas reaction may be chemically expressed as:

$$CH_4 + \frac{1}{2}[O_2 + 3.77N_2] \rightarrow 2H_2 + CO + 1.54N_2 + Heat$$

Pre-engine catalyst 11 may be any catayst that provides partial oxidation of methane. An example of a suitable catalyst 11 is a ceramic monolithic catalyst loaded with 10% by weight rhodium. However, this is but one example. Other catalysts, such as metallic catalysts, and catalysts having oxidizing metals other than rhodium could be used.

At engine 10, the syngas is mixed with the natural gas that bypassed the pre-engine catalyst 11, forming a hydrogen-enriched fuel. This hydrogen-enriched fuel possesses a heating value similar to that of natural gas and is therefore compatible with present day natural gas engine technology. In addition, the addition of hydrogen to the fuel mixture results in combustion with less energy input and can burn at leaner equivalence ratios than natural gas in a lean-burn case, or with more EGR in the stoichiometric case.

The hydrogen-enriched mixture of syngas and natural gas is mixed with exhaust gas. A feature of the invention is the recognition of how the amount of natural gas delivered to catalyst 11 (and therefore the relative amount of syngas in the fuel mixture delivered to engine 10) is related to the engine's tolerance to recirculated exhaust gas R.

As explained below in connection with FIGS. 4–9, experimentation can be performed for a particular engine to determine the "syngas fraction" at which the "EGR fraction" can be maximized without undue loss of engine efficiency. The engine/catalyst system operates stoichiometrically, that is, the system's air/fuel mixture is optimum. However, the same concepts could be applied to an engine/catalyst system that is rich or lean burn, with the results that EGR tolerance is increased.

In practice, for a particular engine 10 operating at a given speed and load, an optimum percent of natural gas delivered to catalyst 11 relative to that delivered directly to engine 10 is experimentally determined. This optimum percent results in a certain "syngas fraction." The engine 10 is operated through a range of syngas fractions. At each syngas fraction, the maximum amount of exhaust gas that may be delivered to engine 10 is determined by determining the amount at which the engine begins to misfire. The engine is also evaluated in terms of efficiency. Thus, for each syngas fraction, there is a maximum EGR value and an efficiency value. A syngas fraction that provides a desired balance of efficiency and EGR tolerance is selected.

With increased use of EGR, $NO_x$ emissions decrease. In addition, a high EGR fraction allows increased compression ratios and manifold boost pressures, approaching those used in lean-burn engines. It is expected that with the SSENGC approach, engine 10 will be capable of operating at boost levels as much as 50 percent higher than otherwise used in stoichiometric operation. Its compression ratio will approach lean-burn engine compression ratios, with a resultant increase in BTE.

Once an appropriate syngas fraction and EGR fraction are determined for a particular engine, they are controlled via valves 13 and 15, respectively. These fractions may be adjusted during operation by a controller 16 for varying speeds and loads on engine 10.

Experimentation has been performed on a spark-ignited single-cylinder engine 10, modified for natural gas operation. The following are the engine specifications:

| | |
|---|---|
| displacement | 2.44 L (148.9 in³) |
| bore | 137.2 mm (5.4 in) |
| stroke | 165.1 mm (6.5 in) |
| combustion chamber | open with spherical piston bowl |
| compression ratio | 11.9:1 |
| number of valves | 2 intake, 2 exhaust |

This engine 10 is referred to herein as the "test engine 10," and its operating characteristics are described herein as an example of implementation of the invention.

For test engine 10, the pre-engine catalyst 11 was comprised of a ceramic monolithic substrate with 300 cpsi and a 10.5 mil wall thickness coated with a gamma alumina (140 m²/g) washcoat. Rhodium was loaded onto the washcoat at 10 percent by weight.

FIG. 2 illustrates the composition of the syngas produced by pre-engine catalyst 11 as implemented in accordance with the preceding paragraph. The syngas composition is expressed as a function of the catalyst equivalence ratio, 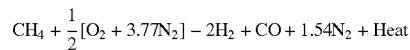. Hydrogen content is maximized and $CH_4$ and $O_2$ breakthrough is minimized at a catalyst equivalence ratio of approximately 2.8. At this ratio, the specific component values of the syngas are set out in FIG. 3.

Test engine 11 was operated at 1800 rpm and a constant 11.0 bar (160 psi) bmep load at wide open throttle. The engine/catalyst system (engine 10 and pre-engine catalyst 11) was maintained stoichiometric (1.0) for various syngas fractions. Spark timing was adjusted to maintain a constant 11.0 bar load at the minimum boost pressure.

The following equation sets out the overall equivalence ratio for the system, $\phi_{system}$, where the "system" is the pre-engine catalyst 11 and the engine 10. This equivalence ratio is maintained at a value of 1, and is equal to the stoichiometric air-to-fuel ratio of natural gas divided by the air-to-fuel ratio of the system:

$$\phi_{system} = \frac{\left.\frac{A}{F}\right|_{stoichiometric}}{\frac{m_{A,engine} + m_{A,catalyst}}{m_{NG,engine} + m_{NG,catalyst}}},$$

where the m values are mass flow rates.

The syngas fraction, R, is the fraction of natural gas delivered to the pre-engine catalyst 11 relative to the total amount of gas delivered to the engine/catalyst system:

$$R = \frac{m_{NG,catalyst}}{m_{NG,engine} + m_{NG,catalyst}}$$

To measure the EGR fraction, the mass flow rate of EGR is determined from measured molar $CO_2$ concentrations in the syngas, the air/fuel intake charge, and the exhaust. First, the EGR fraction of the fuel mixture is expressed in terms of mass flow rates as follows:

$$EGR = \frac{m_{EGR}}{m_A + m_{NG} + m_{EGR} + m_{SG}} \times 100$$

The unknown in the above equation is the EGR mass flow rate, $m_{EGR}$. It can be determined from the following equation, which relates the measured $CO_2$ mole fraction in the intake charge, $X_{CO2,intake}$, to the total intake molar flow rate, $n_A + n_{NG} + n_{EGR} + n_{SG}$:

$$X_{CO_2,intake} = \frac{n_{CO_2,EGR} + n_{CO_2,SG}}{n_A + n_{NG} + n_{EGR} + n_{SG}}$$

The above equation can be re-expressed in terms of mole fractions (x), molecular weights (MWT), and mass flow rates (m), where all mole fractions are assumed dry:

$$X_{CO_2 intake} = \frac{X_{CO_2 EGR}\frac{m_{EGR}}{MWT_{EGR}} + X_{CO_2 SG}\frac{m_{SG}}{MWT_{SG}}}{\frac{m_A}{MWT_A} + \frac{m_{NG}}{MWT_{NG}} + \frac{m_{EGR}}{MWT_{EGR}} + \frac{m_{SG}}{MWT_{SG}}}$$

where $X_{CO2,EGR}$ is the mole fraction of $CO_2$ in the exhaust gas, $X_{CO2,SG}$ is the measured $CO_2$ mole fraction in the syngas, and $X_{CO2,INTK}$ is the measured $CO_2$ mole fraction in the total intake charge.

Algebraic manipulation yields the mass flow rate of EGR as follows:

$$m_{EGR} = \frac{MWT_{EGR}}{X_{CO_2 intake} - X_{CO_2 EGR}} \times (\alpha - \beta)$$

where:

$$\alpha = \frac{m_{SG}}{MWT_{SG}} \times (X_{CO_2 SG} - X_{CO_2 intake})$$

$$\beta = X_{CO_2 intake}\left(\frac{m_A}{MWT_A} + \frac{m_{NG}}{MWT_{NG}}\right)$$

Then, the EGR fraction is easily determined from the above equation.

FIG. 4 illustrates maximum EGR fractions for various values of the syngas fraction, R, where the EGR fraction is measured using the above equations. The baseline case is where there is no syngas, that is, where $m_{NG,\ catalyst}=0$ and thus $m_{SG}=0$ in the above expression for the EGR fraction. At an R of 40%, the maximum EGR fraction is 38.8%. This can be compared to a value of 27%, which would be the case for a comparable engine without syngas. Thus, the EGR tolerance of the engine is extended by approximately 44%. It is expected that EGR fractions can approach 50%.

Figure 5:
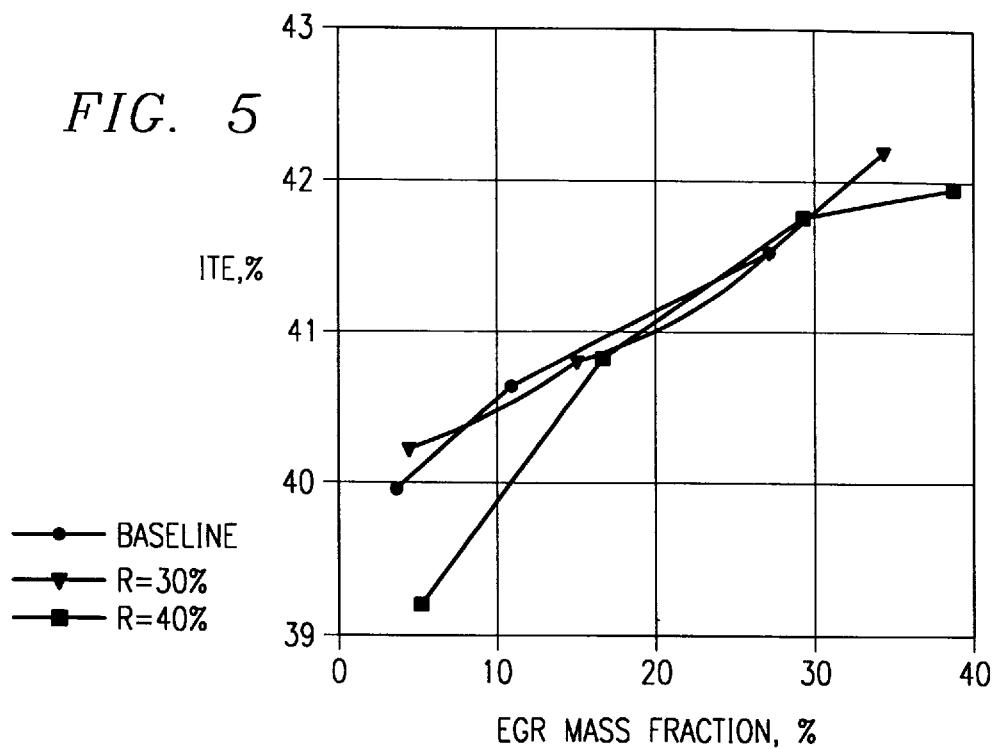
FIG. 5 illustrates how the engine of FIG. 1, operating at various syngas fractions, can be evaluated in terms of efficiency.

FIG. 5 illustrates how engine 10, operating at varying syngas fractions, can be evaluated in terms of indicated thermal efficiency (ITE). In general, above an EGR fraction of 20%, engine 10 operates as efficiently with syngas as without.

Figure 6:
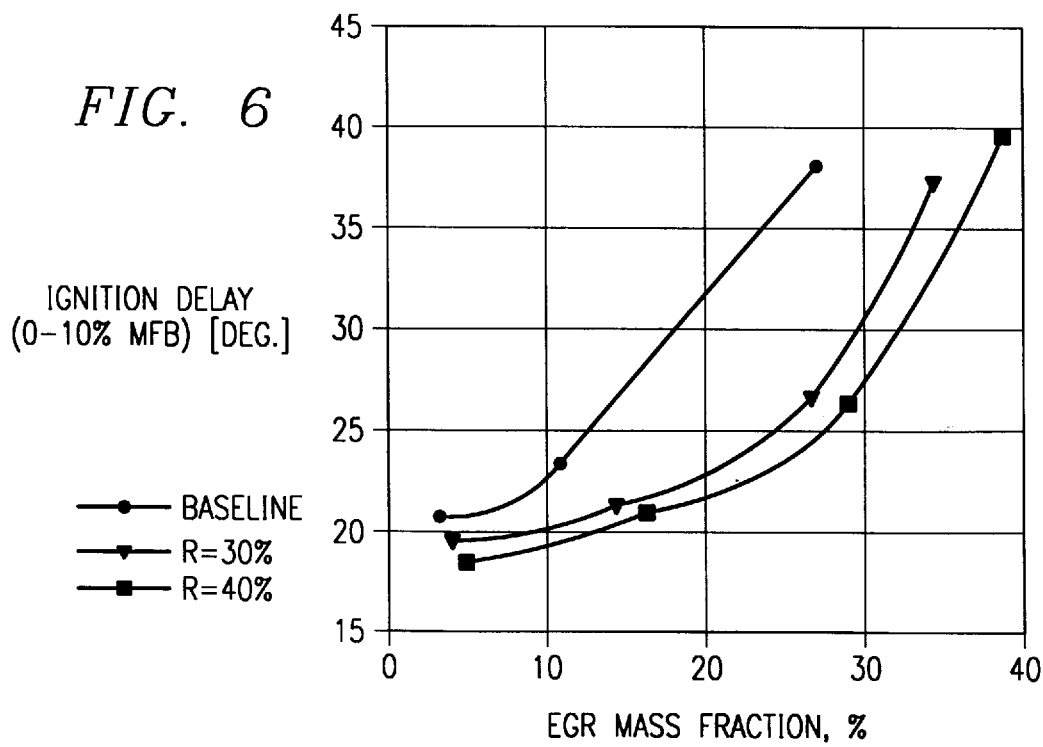

The reason for the comparable ITE's for varying syngas fractions is explained by examining ignition delay and the 10–90 percent mass fraction burn duration. These characteristics are illustrated in FIGS. 6 and 7, respectively. FIG. 6 illustrates that the ignition delay decreases with an increasing syngas fraction for a given EGR fraction. FIG. 7 illustrates a similar trend past EGR fractions of 10%.

FIG. 8 illustrates how raw uncorrected $NO_x$ varies with the syngas and EGR fractions. At low EGR fractions, the baseline case (no syngas) consistently generates more $NO_x$ than the syngas cases. This occurs because syngas itself provides an EGR effect in the sense that it contains $CO_2$ as well as other non-combustible gases. As the EGR fraction approaches 30%, the $NO_x$ values for the baseline case approach the $NO_x$ values for the syngas cases.

Figure 9:
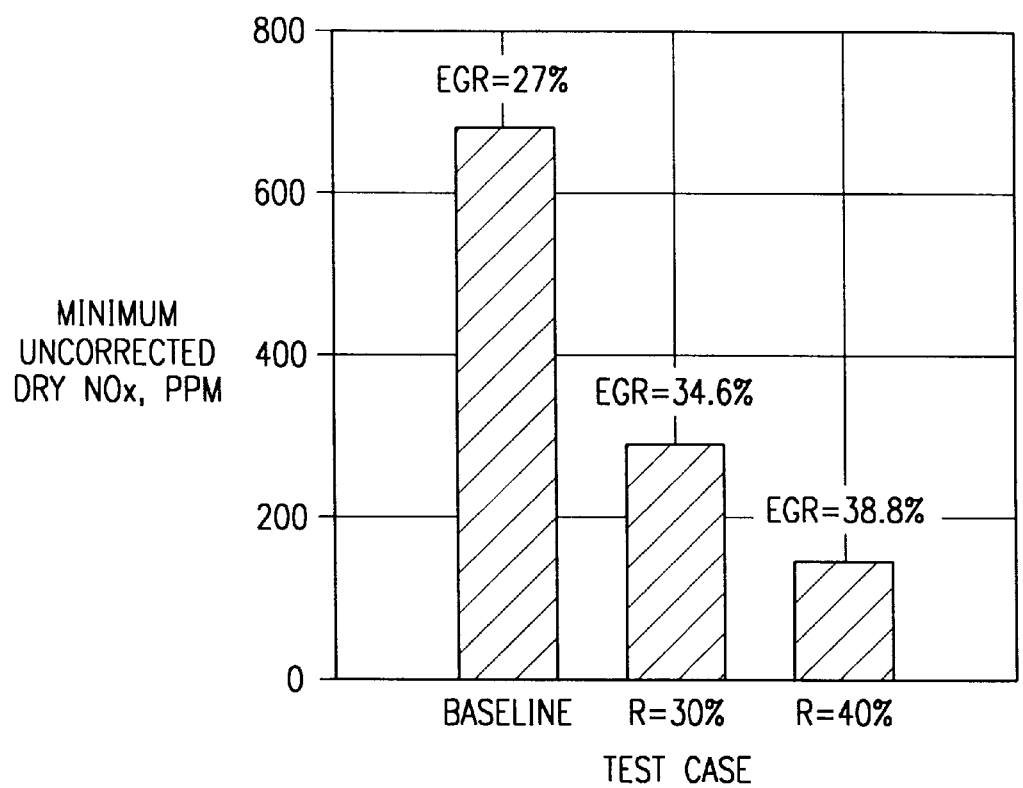

FIG. 9 illustrates the minimum $NO_x$ at the corresponding maximum EGR fractions. The minimum $NO_x$ for the baseline case was 680 ppm whereas the minimum $NO_x$ for a syngas fraction of 40% was 156 ppm. Thus, syngas reduced $NO_x$ emissions by 77% relative to baseline.

Because of the low $NO_x$ levels, deviations in the engine equivalence ratio may occur without raising $NO_x$ above acceptable limits. Thus, control system algorithms may be relaxed and shifts in the $O_2$ sensor at the exhaust are tolerated.

Referring again to FIGS. 1 and 1A, a three-way catalyst 12 is used to treat the unrecirculated exhaust gas. Because of the reduced $NO_x$ emissions, catalyst 12 can have reduced efficiency requirements as compared to the same catalyst used in a conventional engine 10.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of operating an internal combustion engine, comprising the steps of:

delivering air to said engine and to a pre-engine catalyst that performs partial oxidization of methane;
   delivering natural gas to said engine and to said catalyst;

such that said catalyst provides a syngas containing hydrogen and the amount of natural gas delivered to said pre-engine catalyst defines a syngas fraction of said natural gas;

delivering recirculated exhaust gas to said engine such that the amount of said exhaust gas defines an exhaust gas fraction of said air, natural gas, exhaust gas, and syngas;

wherein said syngas fraction and said exhaust gas fraction are maximized for a desired engine efficiency.

2. The method of claim 1, wherein said catalyst is a monolithic catalyst.

3. The method of claim 2, wherein said catalyst is a rhodium-based catalyst.

4. The method of claim 1, wherein said syngas fraction is greater than 20 percent.

5. The method of claim 1, wherein said exhaust gas fraction is greater than 30 percent.

6. The method of claim 1, further comprising the step of treating unrecirculated exhaust from said engine with an after-treatment catalyst.

7. The method of claim 6, wherein said after-treatment catalyst is a three-way catalyst.

8. The method of claim 1, wherein said engine and said pre-engine catalyst are operated at a stoichiometric air-to-fuel ratio.

* * * * *